United States Patent
Sano et al.

(10) Patent No.: US 11,489,478 B2
(45) Date of Patent: Nov. 1, 2022

(54) POWER CONVERSION DEVICE

(71) Applicant: Mitsubishi Electric Corporation, Tokyo (JP)

(72) Inventors: Sota Sano, Tokyo (JP); Akira Satake, Tokyo (JP); Shinsaku Kusube, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 63 days.

(21) Appl. No.: 17/287,128

(22) PCT Filed: Apr. 23, 2019

(86) PCT No.: PCT/JP2019/017231
§ 371 (c)(1),
(2) Date: Apr. 21, 2021

(87) PCT Pub. No.: WO2020/148925
PCT Pub. Date: Jul. 23, 2020

(65) Prior Publication Data
US 2021/0391817 A1    Dec. 16, 2021

(30) Foreign Application Priority Data
Jan. 16, 2019  (JP) .............................. JP2019-004936

(51) Int. Cl.
*H02P 27/08* (2006.01)
*G06N 20/00* (2019.01)
*H02M 7/5395* (2006.01)

(52) U.S. Cl.
CPC ........... *H02P 27/085* (2013.01); *G06N 20/00* (2019.01); *H02M 7/5395* (2013.01)

(58) Field of Classification Search
CPC ...... H02P 27/085; H02P 21/22; H02M 7/5395
See application file for complete search history.

(56) References Cited

U.S. PATENT DOCUMENTS

| 8,466,642 | B2 * | 6/2013 | Imura ....................... H02P 6/14 |
| | | | 318/438 |
| 8,498,136 | B2 * | 7/2013 | Shinomoto ......... H02M 1/4208 |
| | | | 363/125 |

(Continued)

FOREIGN PATENT DOCUMENTS

| JP | 8-33399 A | 2/1996 |
| JP | 2006-174697 A | 6/2006 |

(Continued)

OTHER PUBLICATIONS

International Search Report and Written Opinion dated Aug. 6, 2019, received for PCT Application No. PCT/JP2019/017231, Filed on Apr. 23, 2019, 6 pages including English Translation.

*Primary Examiner* — Rina I Duda
(74) *Attorney, Agent, or Firm* — Xsensus LLP

(57) ABSTRACT

This power conversion device includes: a current detection unit for detecting current flowing through a rotary electric machine; a switching pattern determination unit for determining a switching pattern on the basis of the detected current, a current prediction value, a current command value, and a current harmonic command value; and a power conversion unit for outputting AC power to the rotary electric machine in accordance with the switching pattern, wherein the switching pattern determination unit determines the switching pattern so that the current value follows the current command value and the current harmonic becomes equal to or smaller than a limit value.

20 Claims, 11 Drawing Sheets

(56) References Cited

U.S. PATENT DOCUMENTS

| | | | |
|---|---|---|---|
| 2006/0125435 A1 | 6/2006 | Geyer et al. | |
| 2010/0277149 A1* | 11/2010 | Furutani | H02M 1/0845 |
| | | | 323/282 |
| 2016/0028339 A1* | 1/2016 | Nakai | H02P 21/50 |
| | | | 318/400.02 |
| 2016/0036317 A1* | 2/2016 | Shimomugi | H02M 1/32 |
| | | | 363/53 |
| 2017/0310264 A1* | 10/2017 | Okamoto | B66B 1/30 |

FOREIGN PATENT DOCUMENTS

| | | |
|---|---|---|
| JP | 2017-204913 A | 11/2017 |
| WO | 2020/217879 A1 | 10/2020 |

\* cited by examiner

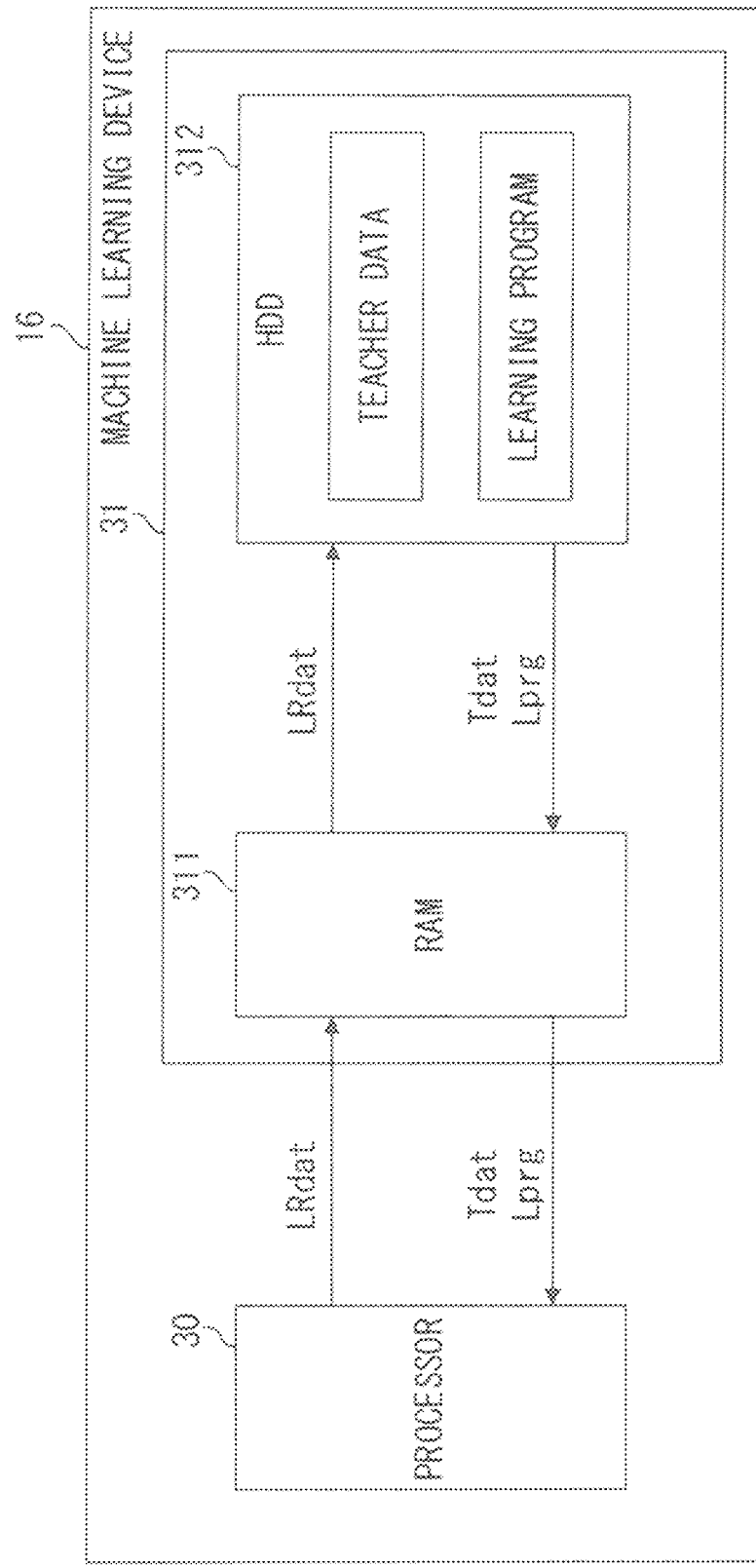

POWER CONVERSION DEVICE

CROSS-REFERENCE TO RELATED APPLICATIONS

The present application is based on PCT filing PCT/JP2019/017231, filed Apr. 23, 2019, which claims priority to JP 2019-004936, filed Jan. 16, 2019, the entire contents of each are incorporated herein by reference.

TECHNICAL FIELD

The present disclosure relates to a power conversion device.

BACKGROUND ART

In drive control of a multiphase AC rotary machine, "direct torque control" is known as an example of instantaneous current control in which the switching state of a power conversion device is directly calculated on the basis of the state (current, torque, rotation speed, etc.) of a motor.

A direct torque control method of determining the switching state of a power conversion device using a switching table is disclosed (for example, Patent Document 1).

In the technology disclosed in Patent Document 1, the switching state (switching loss) of "direct torque control" is determined by the table. However, for a complicated operation or a device that drives a plurality of types of rotary electric machines, there is a problem that the table designing is complicated.

To solve this, disclosed is a method of predicting the state of a motor for using each switching state through model prediction, and determining an optimum switching state on the basis of an evaluation function (for example, Patent Document 2).

CITATION LIST

Patent Document

Patent Document 1: Japanese Laid-Open Patent Publication No. 8-33399 (paragraphs [0006], [0023], [0038] and FIG. 1, FIG. 2)

Patent Document 2: Japanese Laid-Open Patent Publication No. 2006-174697 (paragraphs [0007] to [0016] and FIG. 1, FIG. 3)

SUMMARY OF THE INVENTION

Problems to be Solved by the Invention

In the technology disclosed in Patent Document 2, table designing is not needed and an effect of reducing switching loss is expected. This technology uses a method of determining the switching state by predicting a state for several steps ahead, and thus, in a short interval, an effect of suppressing increase of a current harmonic and decreasing the number of times of switching, is expected. However, in a longer interval (e.g., one cycle of electric-angle frequency), such an effect is not always obtained. In addition, in the direct torque control, it is necessary to increase/decrease a limit width for a control target, and there is a problem that it is difficult to directly determine a limit width for a current harmonic.

The present disclosure has been made to solve the above problems, and aims to provide a power conversion device capable of, in direct torque control with a current harmonic directly as a control target, performing control so that the current value follows a command value and the current harmonic becomes equal to or smaller than a limit value.

Solution to the Problems

A power conversion device according to the present disclosure is a power conversion device which converts DC power to AC power through switching operations of a plurality of switching elements and supplies the AC power to a rotary electric machine, the power conversion device including: a current detection unit for detecting current flowing through the rotary electric machine; a switching pattern determination unit for determining a switching pattern representing timings of ON/OFF switchover of the plurality of switching elements, on the basis of a current value detected by the current detection unit, a current prediction value predicted from the current value, a current command value which is a command value for the current value, and a current harmonic command value which is a command value for a current harmonic of the current value; and a power conversion unit which causes the plurality of switching elements to perform switching operations in accordance with the switching pattern and outputs the AC power to the rotary electric machine, wherein the switching pattern determination unit determines the switching pattern so that the current value follows the current command value and an effective value of a harmonic component of the current value becomes equal to or smaller than the current harmonic command value.

Effect of the Invention

The power conversion device according to the present disclosure includes the switching pattern determination unit for determining the switching pattern representing timings of ON/OFF switchover of the plurality of switching elements on the basis of the current value detected by the current detection unit, the current prediction value predicted from the current value, the current command value which is the command value for the current value, and the current harmonic command value which is the command value for the current harmonic of the current value, and the switching pattern determination unit determines the switching pattern so that the current value follows the current command value and the effective value of the harmonic component of the current value becomes equal to or smaller than the current harmonic command value. Thus, it becomes possible to obtain the power conversion device that can control the rotary electric machine so that the current value follows the command value and the current harmonic becomes equal to or smaller than the limit value.

BRIEF DESCRIPTION OF THE DRAWINGS

FIG. 11 is a hardware configuration diagram for implementing the machine learning device according to embodiment 4.

DESCRIPTION OF EMBODIMENTS

Embodiment 1

Embodiment 1 relates to a power conversion device including: a current detection unit for detecting a current value of current flowing through a rotary electric machine; a switching pattern determination unit for determining a switching pattern for switching elements on the basis of the current value, a current prediction value predicted from the current value, a current command value, and a current harmonic command value; and a power conversion unit which causes the switching elements to perform switching operations in accordance with the switching pattern and outputs AC power to the rotary electric machine, wherein the switching pattern determination unit determines the switching pattern so that the current value follows the current command value and the harmonic of the current value becomes equal to or smaller than the current harmonic command value.

Hereinafter, the configuration and operation of the power conversion device according to embodiment 1 will be described with reference to FIG. 1 which is a block diagram showing the configuration of the power conversion device, FIG. 2 which is a hardware configuration diagram for implementing the power conversion device, and FIG. 3 which illustrates switching patterns in the power conversion device.

First, the configuration of a power conversion device 1 of embodiment 1 will be described with reference to FIG. 1.

The entire system for controlling a rotary electric machine is composed of the power conversion device 1, a DC power supply 2, and a rotary electric machine 3.

Figure 1:
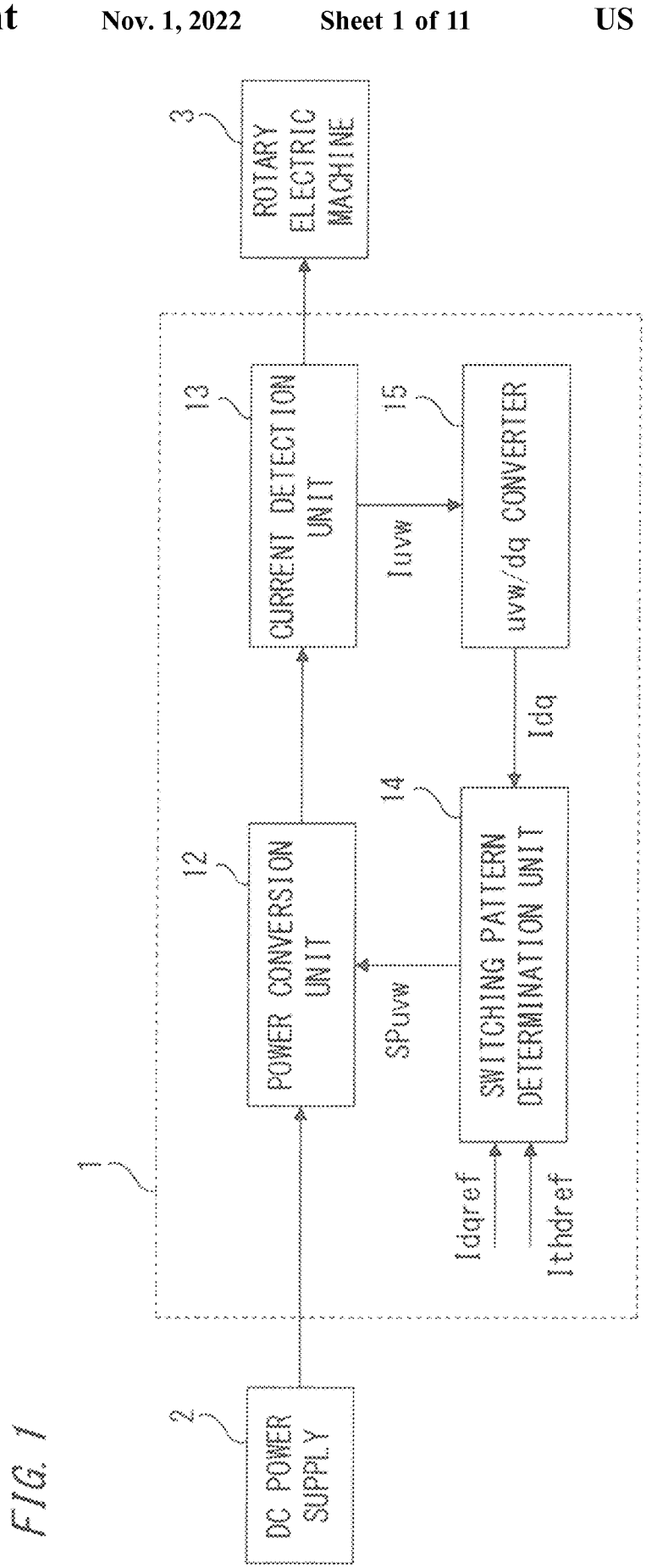
FIG. 1 is a block diagram showing the configuration of a power conversion device according to embodiment 1.

As shown in FIG. 1, the power conversion device 1 is connected between the DC power supply 2 and the rotary electric machine 3. The power conversion device 1 converts DC power from the DC power supply 2, to AC power, and outputs the AC power to the rotary electric machine 3, thus controlling the rotary electric machine 3. The rotary electric machine 3 converts the AC power outputted from the DC power supply 2, to motive power.

The rotary electric machine 3 used here is assumed to be an electric motor, and as the rotary electric machine 3, various types of rotary electric machines such as an induction electric motor and a synchronous electric motor may be used.

The power conversion device 1 includes a power conversion unit 12 which is a main circuit, a current detection unit 13, a switching pattern determination unit 14, and a uvw/dq converter 15.

The current detection unit 13 detects current values Iu, Iv, Iw of currents outputted from the power conversion unit 12 to the rotary electric machine 3. The uvw/dq converter 15 converts the detected current values Iu, Iv, Iw to Id, Iq which are current values in a dq coordinate system. The switching pattern determination unit 14 generates switching patterns SPu, SPv, SPw, on the basis of the current values Id, Iq outputted from the uvw/dq converter 15, and current command values Idref, Iqref and a current harmonic command value Ithdref inputted from outside.

For describing the current values Iu, Iv, Iw collectively, they are referred to as current values Iuvw, as appropriate. For describing the current values Id, Iq collectively, they are referred to as current values Idq, as appropriate. For describing the current command values Idref, Iqref collectively, they are referred to as current command values Idqref, as appropriate. For describing the switching patterns SPu, SPv, SPw collectively, they are referred to as switching patterns SPuvw, as appropriate. The same applies also in FIG. 1.

Figure 2:
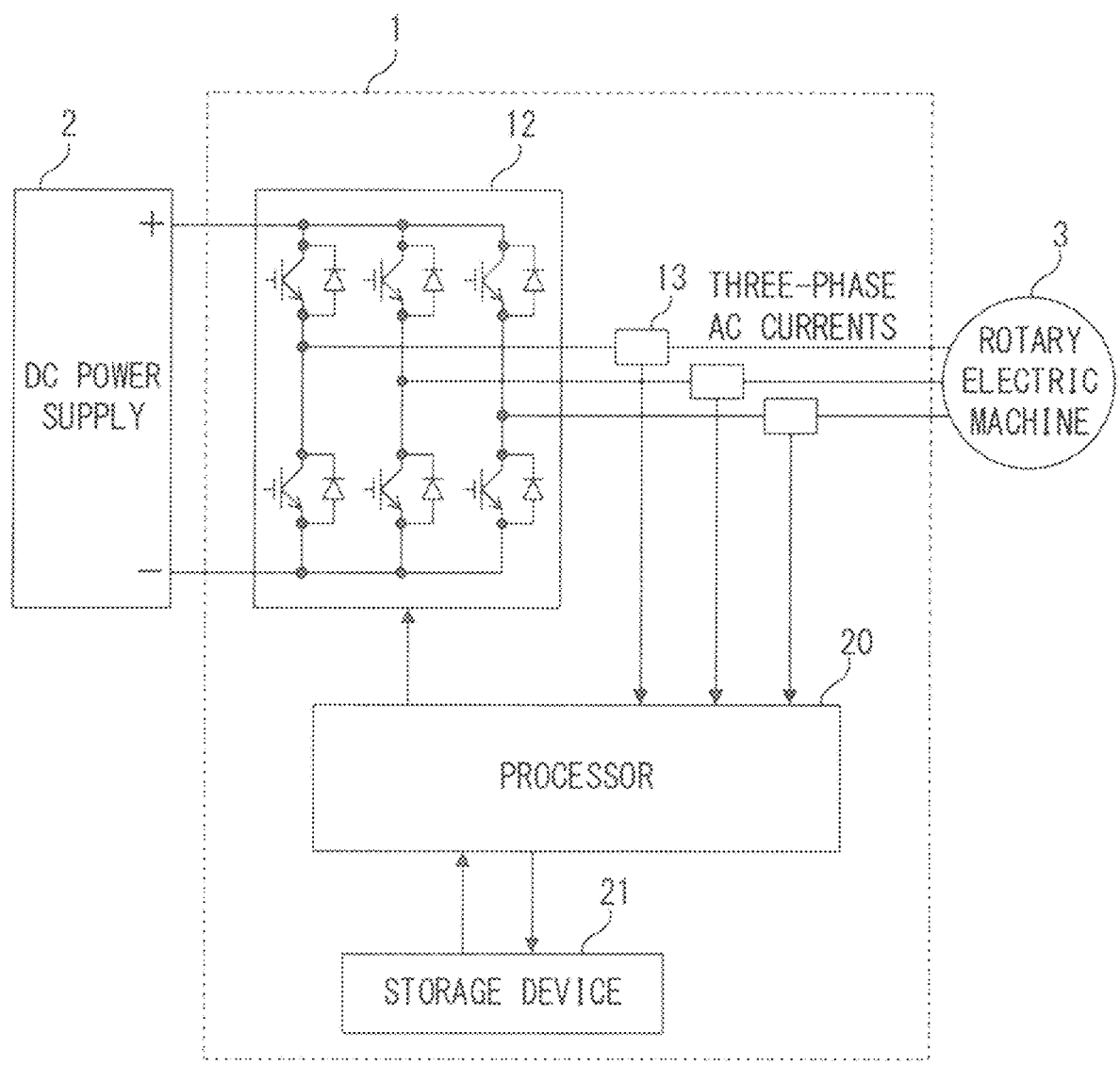
FIG. 2 is a hardware configuration diagram for implementing the power conversion device according to embodiment 1.

The power conversion device 1 is implemented by the hardware configuration shown in FIG. 2.

In FIG. 2, the power conversion device 1 is composed of, as hardware, the power conversion unit 12, the current detection unit 13, a processor 20 for controlling the power conversion unit 12, and a storage device 21 for the processor 20.

With a switching element and a diode connected in antiparallel thereto as one set, the power conversion unit 12 is composed of six sets of the switching elements and the diodes. A series body for one phase is formed by connecting one set in the upper arm and one set in the lower arm in series, and three such series bodies are connected in parallel, to form a three-phase bridge circuit configuration.

Connection points between the upper arms and the lower arms for the respective phases are connected via bus bars to terminals for the respective phases of the rotary electric machine 3.

The power conversion unit 12 converts DC power from the DC power supply 2, to three-phase AC power, to drive the rotary electric machine 3 such as an electric motor which is a load.

Although not shown, the storage device 21 includes a volatile storage device such as a random access memory, and a nonvolatile auxiliary storage device such as a flash memory.

As the nonvolatile auxiliary storage device, a hard disk or the like may be used instead of a flash memory or the like.

The processor 20 executes a program inputted from the storage device 21.

Because the storage device 21 includes the auxiliary storage device and the volatile storage device, the program is inputted from the auxiliary storage device to the processor 20 via the volatile storage device.

The processor 20 may output data such as a calculation result to the volatile storage device of the storage device 21, or may store such data into the auxiliary storage device via the volatile storage device.

Next, the functions and operations of the respective units of the power conversion device 1 will be described.

The power conversion unit 12 converts DC power supplied from the DC power supply 2, to AC power, on the basis of switching patterns SPuvw determined by the switching pattern determination unit 14, and outputs the AC power to the rotary electric machine 3. The switching patterns SPuvw will be described later.

The current detection unit 13 detects three-phase AC currents between the power conversion unit 12 and the rotary electric machine 3, and outputs the three-phase AC currents as current values Iuvw to the uvw/dq converter 15.

Here, as the current detection unit, any current detector such as a current transformer (CT) detector or a shunt resistor may be used. Currents for two phases of the three phases may be detected, and the other one phase may be calculated. Alternatively, 1-shunt current detection method of reproducing three-phase AC current values by one detector may be used.

The uvw/dq converter 15 converts the current values Iuvw detected by the current detection unit 13, to current values Idq for two phases, and outputs the current values Idq to the switching pattern determination unit 14.

At this time, as phase information of the magnetic pole position of the rotary electric machine 3 needed for the conversion, a phase generated in the power conversion device 1 can be used. When a detector for a phase and a speed such as an encoder is provided to the rotary electric machine 3, the detected phase may be used.

In embodiment 1, a case where the current command values are the current command values Idqref in the dq coordinate system is shown as an example. Therefore, the current values Iuvw are converted to the current values Idq. However, if the current command values are command values Iuvwref for three-phase AC currents, the current values Iuvw may be directly outputted to the switching pattern determination unit 14 without being subjected to coordinate conversion.

For using current command values Iαβref in an αβ coordinate system, the current values Iuvw may be converted to current values Iαβ, using a uvw/αβ, converter, and the current values Iαβ may be outputted to the switching pattern determination unit 14.

The switching pattern determination unit 14 generates switching patterns SPuvw so that the current values Idq outputted from the uvw/dq converter 15 follow the current command values Idqref. At this time, the switching patterns SPuvw are determined so that the current harmonic effective value of the current values Idq becomes equal to or smaller than the current harmonic command value Ithdref which is a command value for the current harmonic effective value. That is, the current harmonic command value Ithdref is a limit value for the current harmonic effective value of the current values Idq.

Specifically, the switching pattern determination unit 14 determines the switching patterns SPuvw each formed by a combination of one or a plurality of switching states and a switchover timing.

Next, an example of a method for determining the switching patterns SPuvw will be described with reference to FIG. 3. FIG. 3 shows examples of current command values and current prediction values from a control start time t(k) to N steps ahead. Here, t(k+i) is a time that is i steps later, and t(k+N) is a time that is N steps later.

Figure 3:
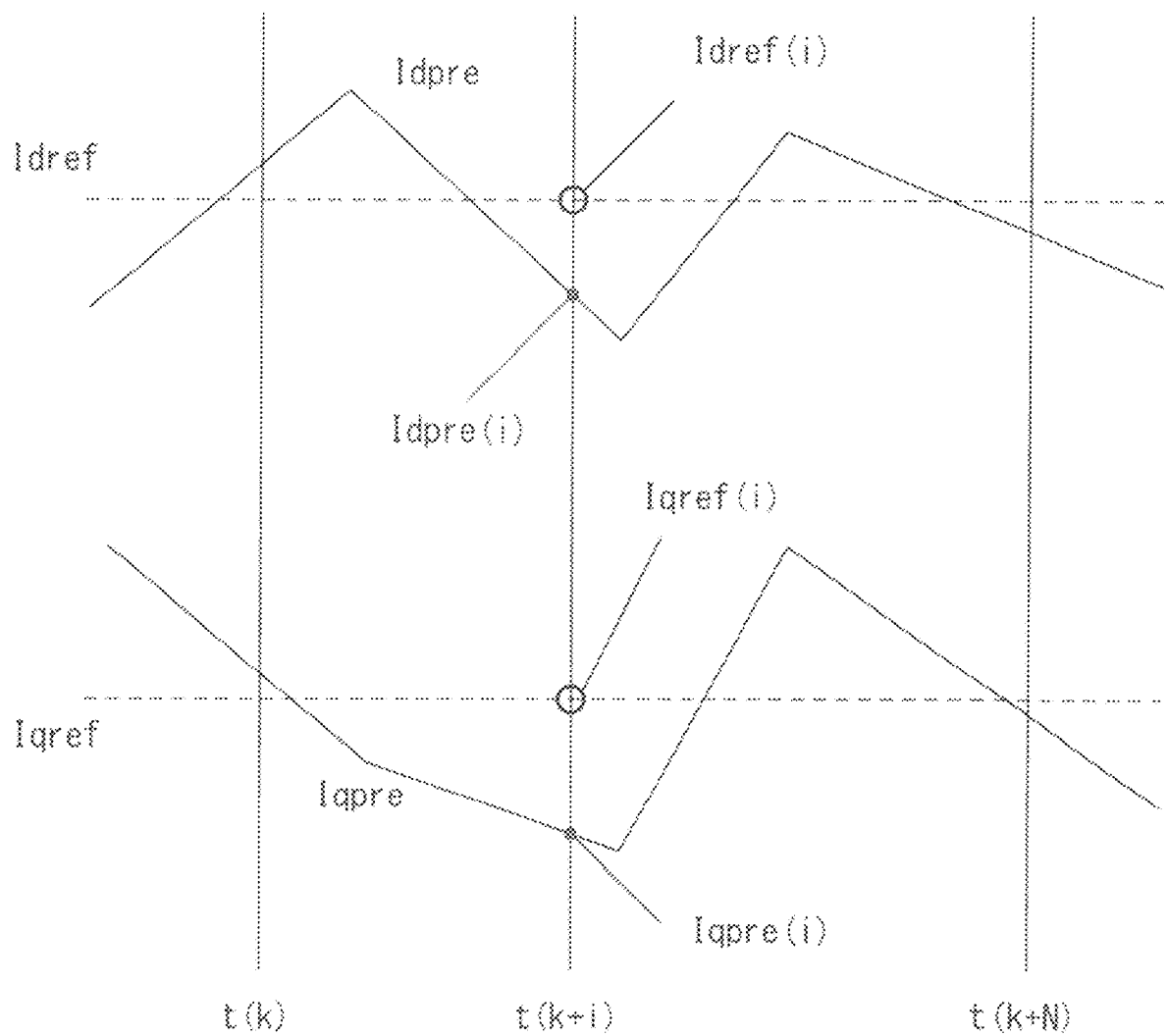
FIG. 3 illustrates switching patterns in the power conversion device according to embodiment 1.

In FIG. 3, Idref, Iqref which are the current command values are indicated by dashed lines, and Idpre, Iqpre which are the current prediction values are indicated by thin lines (broken lines).

The trajectory of the current prediction value (Idpre, Iqpre) changes when the switching state changes. In FIG. 3, a point where the slope of the current prediction value (Idpre, Iqpre) changes (angled point) indicates that the switching state changes at that point.

For describing the current prediction values Idpre, Iqpre collectively, they are referred to as current prediction values Idqpre, as appropriate.

Here, the current prediction values Idqpre are calculated by performing model prediction using a constant of the rotary electric machine 3. In the model prediction, calculation is performed using Expression (1), for example.

Expression (1) is an expression for calculating current prediction values Idqpre(k+1) for one step ahead.

Here, A1, A2, B1 are coefficients calculated from the constant and the speed of the rotary electric machine 3, Ts is a sampling cycle, i.e., a control cycle, Idqpre(k) is the present current value, Ψdqpre(k) is the present rotor interlinkage magnetic flux, and Vdqpre(k) is the present output voltage.

This model prediction expression is generated from a rotary electric machine model of an induction electric motor. However, the prediction expression differs depending on the rotary electric machine to be controlled, and the prediction expression may be generated by another method.

[Mathematical 1]

$$Idqpre(k+1)=e^{A1*Ts}*Idqpre(k)+\int_0^{Ts}(e^{A1*t}dt*A2*\Psi dqpre(k))+\int_0^{Ts}(e^{A1*t}dt*B1*Vdqpre(k)) \quad (1)$$

The N steps are determined by the control cycle and a cycle of calculating the current harmonic effective value, that is, N is represented as (calculation cycle for current harmonic effective value)/(control cycle).

For example, the control cycle is set at 10 μs, and the calculation cycle for the current harmonic effective value is set at one cycle of an electric angle. It is noted that the electric angle is the angle of a rotating magnetic field of the rotary electric machine 3.

Here, that the current values Idq follow the current command values Idqref means that the average values of the current prediction values Idqpre coincide with the current command values Idqref.

For this purpose, Expression (2) and Expression (3) need to be satisfied.

It is noted that the average values of the current prediction values Idqpre can be each calculated by dividing the sum of the current prediction values up to the N steps ahead by the number of the steps.

[Mathematical 2]

$$\Sigma_{i=0}^{N}(Idpref(i)-Iqpre(i))=0 \quad (2)$$

[Mathematical 3]

$$\Sigma_{i=0}^{N}(Iqref(i)-Iqpre(i))=0 \quad (3)$$

Here, if Expression (2) and Expression (3) are satisfied, the average values of the current prediction values Idqpre perfectly coincide with the current command values Idqref. However, it is actually difficult to generate such switching patterns SPuvw. Therefore, in actuality, the switching patterns SPuvw are required to satisfy Expression (4) and Expression (5) using sufficiently small error tolerances Idqtol.

[Mathematical 4]

$$|\Sigma_{i=0}^{N}(Idref(i)-Idpre(i))|\leq Idtol \quad (4)$$

[Mathematical 5]

$$|\Sigma_{i=0}^{N}(Iqref(i)-Iqpre(i))|\leq Iqtol \quad (5)$$

Similarly, the current harmonic effective value is required to satisfy Expression (6).

[Mathematical 6]

$$\sum_{i=0}^{N} \sqrt{(Idref(i) - Idpre(i))^2 + (Iqref(i) - Iqpre(i))^2} \leq Ithdref \quad (6)$$

Here, the current harmonic effective value is calculated as a root sum square of errors of the current prediction values relative to the current command values, as shown in Expression (6).

Alternatively, using a frequency analysis method such as fast Fourier transform, frequency components of the current prediction values may be calculated and then evaluation may be performed using a root sum square of the frequency components other than the fundamental component.

The switching patterns SPuvw generated by the switching pattern determination unit 14 may be each determined as a switching state to be outputted per control cycle.

In addition, a plurality of switching states, the output order thereof, and switchover timings thereof may be determined.

For each switching pattern SPuvw, if a plurality of switching states, the order thereof, and the switchover timings thereof are determined, until the output thereof is completed, control need not be performed. In addition, while the control is performed per control cycle, if a difference between the predicted current value and the actual detected current value is equal to or greater than a prescribed value, the switching pattern SPuvw may be generated again.

When there are a plurality of switching patterns generated, any of the switching patterns may be selected, and for example, such a switching pattern that minimizes the current harmonic effective value may be selected from among the switching patterns.

Alternatively, the switching pattern may be selected such that the current value Idq best follows the current command value Idqref, i.e., the degree of coincidence between the average value of the current prediction value Idqpre and the current command value Idqref is high.

In embodiment 1, a switching pattern is determined on the basis of a command value for the current harmonic effective value, and the rotary electric machine is controlled on the basis of the switching pattern, whereby the current harmonic can be directly controlled. Thus, the rotary electric machine can be driven while the current harmonic which causes noise is reduced to be not greater than the current harmonic command value.

As described above, the power conversion device 1 of embodiment 1 includes: the current detection unit for detecting the current value of current flowing through the rotary electric machine; the switching pattern determination unit for determining a switching pattern for the switching elements on the basis of the current value, a current prediction value predicted from the current value, a current command value, and a current harmonic command value; and the power conversion unit which causes the switching elements to perform switching operations in accordance with the switching pattern and outputs AC power to the rotary electric machine, wherein the switching pattern determination unit determines the switching pattern so that the current value follows the current command value and the harmonic of the current value becomes equal to or smaller than the current harmonic command value.

Thus, the power conversion device of embodiment 1 can control the rotary electric machine so that the current value follows the current command value and the current harmonic becomes equal to or smaller than the current harmonic command value which is a limit value.

Embodiment 2

A power conversion device of embodiment 2 is configured such that, in addition to the current command value and the current harmonic command value, the slope of the current command value is further inputted to the switching pattern determination unit from outside.

Hereinafter, operation of the power conversion device according to embodiment 2 will be described, focusing on a difference from embodiment 1, with reference to FIG. 4 which is a block diagram showing the configuration of the power conversion device and FIG. 5 which illustrates a locus of the current command value.

Figure 4:
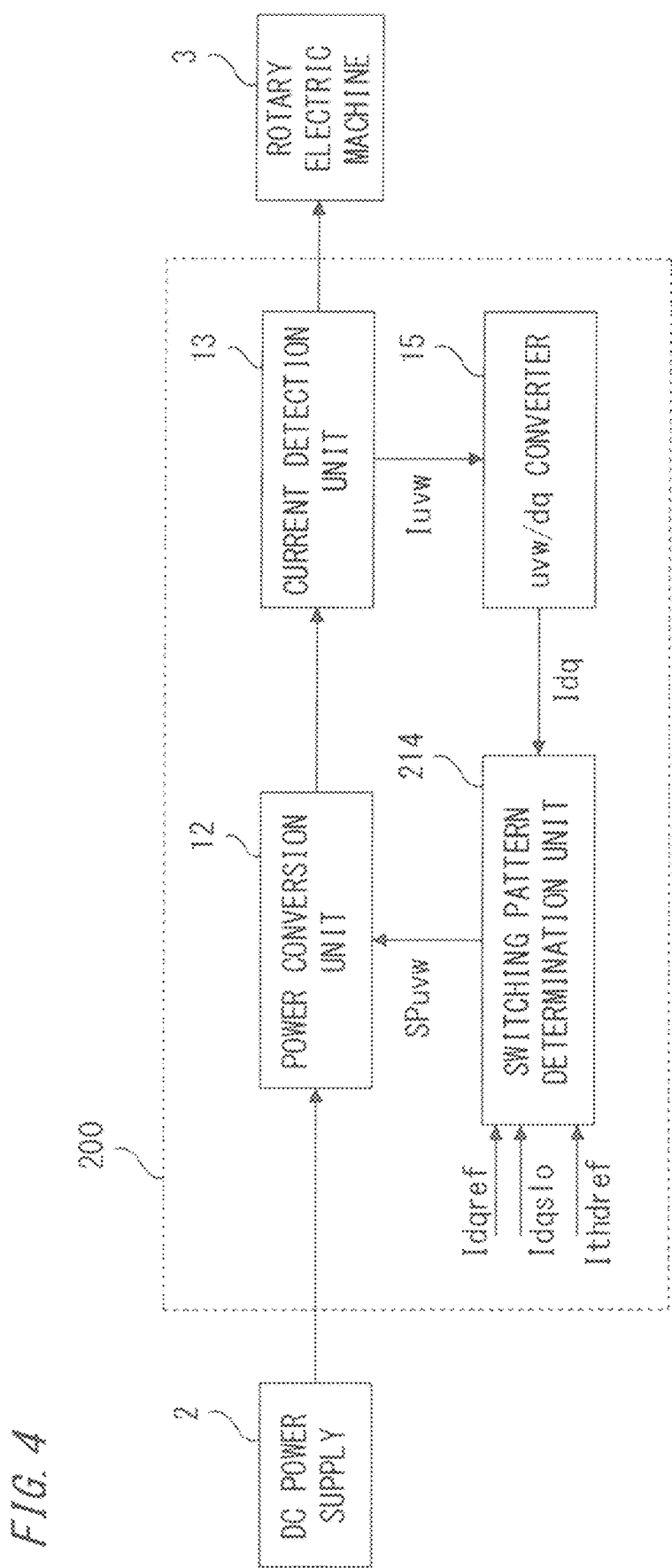
FIG. 4 is a block diagram showing the configuration of a power conversion device according to embodiment 2.

In FIG. 4 which is the block diagram of the power conversion device of embodiment 2, the same or corresponding parts as those in embodiment 1 are denoted by the same reference characters.

First, the configuration of a power conversion device 200 of embodiment 2 will be described with reference to FIG. 4.

The entire system for controlling the rotary electric machine is composed of the power conversion device 200, the DC power supply 2, and the rotary electric machine 3.

In FIG. 4, the power conversion device 200 includes the power conversion unit 12 which is a main circuit, the current detection unit 13, a switching pattern determination unit 214, and the uvw/dq converter 15.

In embodiment 1, the current command values Idqref and the current harmonic command value Ithdref are inputted to the switching pattern determination unit 14 from outside.

In embodiment 2, in addition to the current command values Idqref and the current harmonic command value Ithdref, slopes Idslo, Iqslo of the current command values are inputted to the switching pattern determination unit 214 from outside.

For describing the slopes Idslo, Iqslo of the current command values collectively, they are referred to as slopes Idqslo of the current command values, as appropriate. The same applies also in FIG. 4 and FIG. 5.

Hereinafter, the function and operation of the switching pattern determination unit 214 of embodiment 2, which are different from embodiment 1, will be described with reference to FIG. 4 and FIG. 5.

The switching pattern determination unit 214 receives, in addition to the current command values Idqref, the slopes Idqslo of the current command values from outside, and thereby generates loci of the current command values.

A method for generating the loci of the current command values will be described with reference to FIG. 5. FIG. 5 shows an example of the locus of the current command value from a control start time t(k) to N steps ahead. In FIG. 5, illustration is made for only the current value Id.

At the control start time, a locus (thick dotted line) of the current command value having a slope of Idslo from the current command value Idref as a start point is generated.

Figure 5:
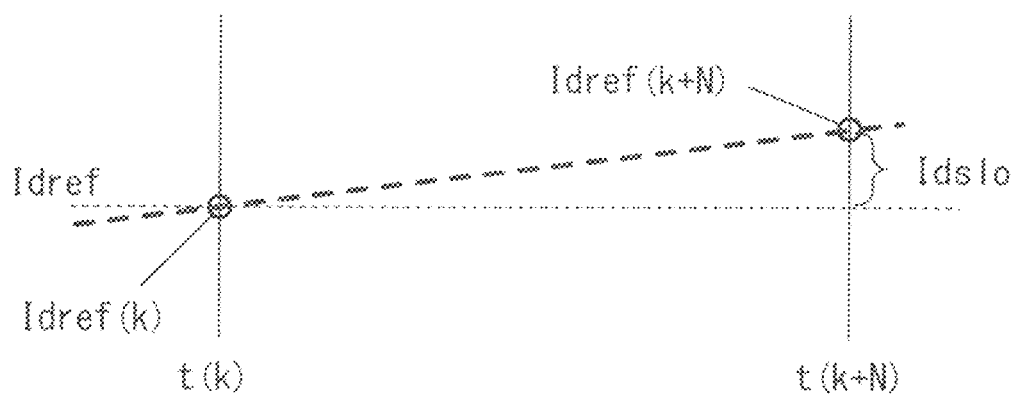
FIG. 5 illustrates a locus of a current command value in the power conversion device according to embodiment 2.

In FIG. 5, the slope Idslo of the current command value is defined as an increase/decrease width at the N steps later. However, the slope Idslo may be defined as an increase/decrease width at one or two steps later, or the like.

In addition, here, the locus of the current command value is generated using only one slope. However, the locus of the current command value may be generated so as to complicatedly change, using a plurality of slopes and switchover points therebetween.

Further, the current command value and the slope at each step may be prepared as a table, and the table may be inputted from outside, to generate the locus of the current command value.

Using the loci of the current command values described with reference to FIG. 5, the switching patterns SPuvw are generated in the same manner as in embodiment 1, and the switching patterns SPuvw are outputted to the power conversion unit 12, whereby the power conversion device 200 controls the rotary electric machine 3.

In embodiment 2, the switching pattern determination unit 214 generates the locus of the current command value on the basis of the current command value and the slope, and thus, also in a transient period in which the speed and torque are changed and the current command value is changed, evaluation for the current harmonic can be accurately performed and the current harmonic can be suppressed.

The power conversion device of embodiment 2 is configured such that, in addition to the current command value and the current harmonic command value, the slope of the current command value is further inputted to the switching pattern determination unit from outside.

Thus, the power conversion device of the present embodiment 2 can control the rotary electric machine so that the current value follows the current command value and the current harmonic becomes equal to or smaller than the current harmonic command value which is a limit value. Further, also in the transient period in which the speed and torque are changed, the current harmonic can be suppressed.

Embodiment 3

A power conversion device of embodiment 3 is configured such that, in addition to the current command value and the current harmonic command value, an additional control performance command value is further inputted to the switching pattern determination unit from outside.

Hereinafter, operation of the power conversion device according to embodiment 3 will be described, focusing on a difference from embodiment 1, with reference to FIG. 6 which is a block diagram showing the configuration of the power conversion device and FIG. 7 which illustrates switching patterns.

Figure 6:
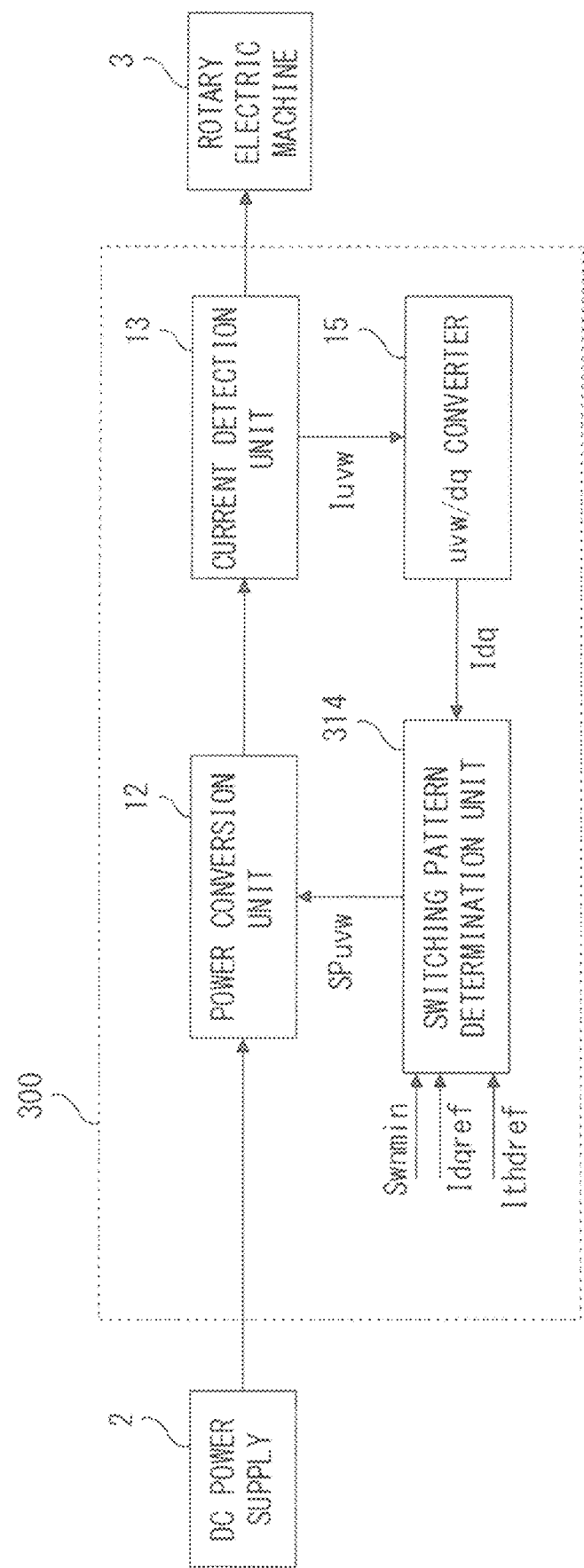
FIG. 6 is a block diagram showing the configuration of a power conversion device according to embodiment 3.

In FIG. 6 which is the block diagram of the power conversion device of embodiment 3, the same or corresponding parts as those in embodiment 1 are denoted by the same reference characters.

First, the configuration of a power conversion device 300 of embodiment 3 will be described with reference to FIG. 6.

The entire system for controlling the rotary electric machine is composed of the power conversion device 300, the DC power supply 2, and the rotary electric machine 3.

In FIG. 6, the power conversion device 300 includes the power conversion unit 12 which is a main circuit, the current detection unit 13, a switching pattern determination unit 314, and the uvw/dq converter 15.

In embodiment 1, the current command values Idqref and the current harmonic command value Ithdref are inputted to the switching pattern determination unit 14 from outside.

In embodiment 3, in addition to the current command values Idqref and the current harmonic command value Ithdref, a command value Swnmin for minimizing the number of times of switching is inputted as an additional control performance command value, to the switching pattern determination unit 314 from outside.

Hereinafter, the function and operation of the switching pattern determination unit 314 of embodiment 3, which are different from embodiment 1, will be described with reference to FIG. 6 and FIG. 7.

In embodiment 1, the switching pattern determination unit 14 determines the switching patterns so that the current values Idq follow the current command values Idqref and the current harmonic becomes equal to or smaller than the current harmonic command value Ithdref.

In embodiment 3, in addition to the above condition, the switching pattern determination unit 314 receives an additional control performance command value and generates switching patterns so as to satisfy also the additional command value.

In FIG. 6, a command value (Swnmin) for minimizing the number of times of switching as an example of the additional control performance is inputted.

The switching pattern determination unit 314 first determines a plurality of switching patterns so that the current values Idq inputted from the uvw/dq converter 15 follow the current command values Idqref and the current harmonic becomes equal to or smaller than the current harmonic command value Ithdref. Further, the switching pattern determination unit 314 selects the switching pattern in which the number of times of switching is smallest from among the switching patterns, and outputs the selected switching pattern as the switching pattern SPuvw to the power conversion unit 12.

A method for selecting the switching pattern will be described with reference to FIG. 7.

Figure 7:
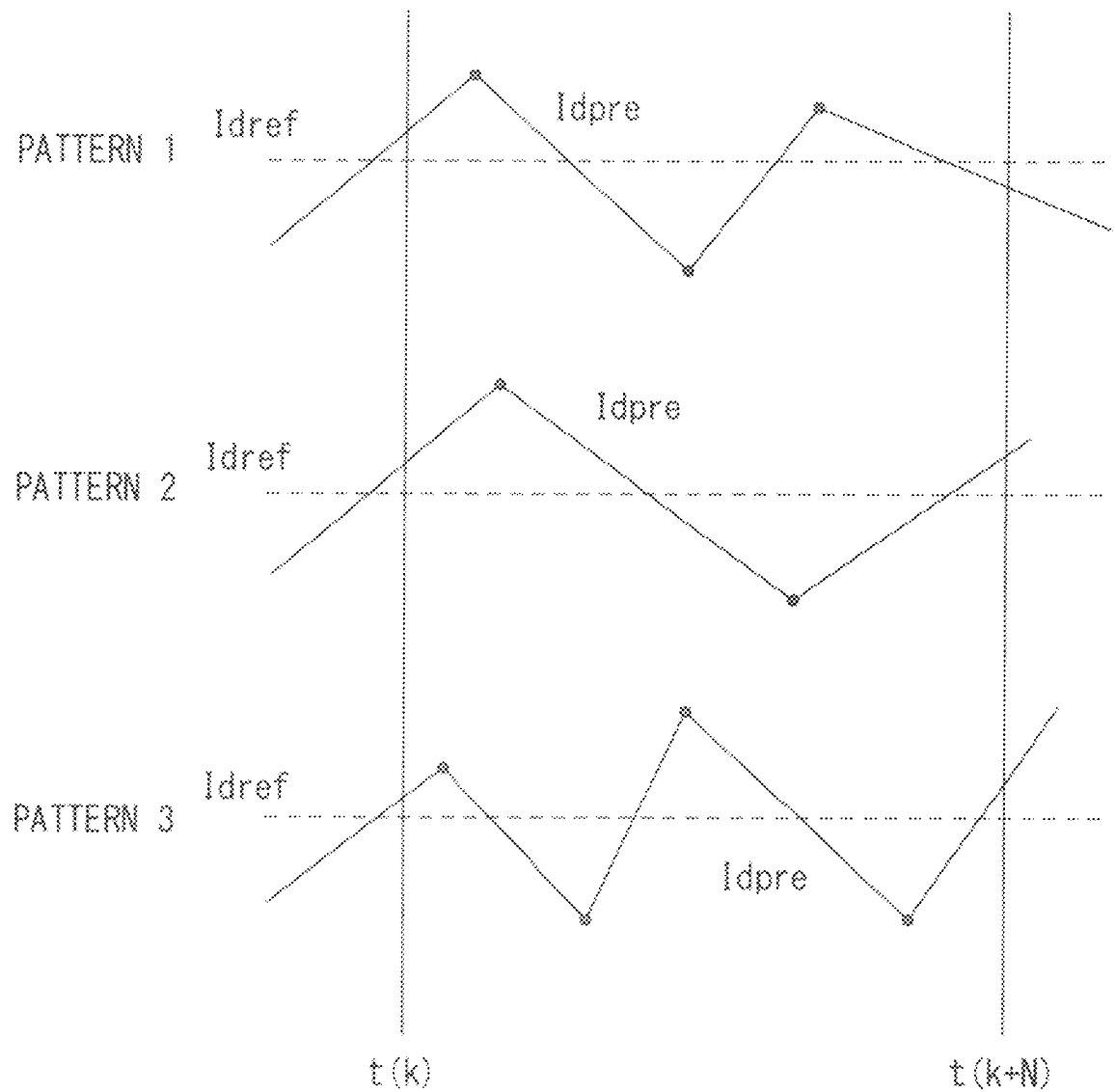
FIG. 7 illustrates switching patterns in the power conversion device according to embodiment 3.

FIG. 7 shows candidate examples of switching patterns determined so that the current values Idq inputted from the uvw/dq converter 15 follow the current command values Idqref and the current harmonic becomes equal to or smaller than the current harmonic command value Ithdref.

In FIG. 7, from among the three switching pattern candidates (patterns 1 to 3), the switching pattern SPuvw in which the number of times of switching is smallest is selected. The number of times of switching is the number of times the switching element for each phase is switched between ON and OFF, and black dots in FIG. 7 indicate times at which the switching state is switched. It is noted that FIG. 7 shows switchover for one phase of the three phases.

In FIG. 7, the number of times of switching is three in the pattern 1, two in the pattern 2, and four in the pattern 3. Therefore, because the pattern 2 has the smallest number of times of switching, the pattern 2 is selected and outputted as the switching pattern SPuvw to the power conversion unit 12.

In embodiment 3, the switching pattern determination unit 314 generates a plurality of switching patterns so that the current prediction value follows the current command value and the current harmonic becomes equal to or smaller than the current harmonic command value. Then, the switching pattern determination unit 314 selects an optimum one of the plurality of switching patterns on the basis of an additional control performance command, e.g., a command for minimizing the number of times of switching, and outputs the selected switching pattern as the switching pattern SPuvw to the power conversion unit 12. Thus, in addition to suppression of the current harmonic, it is possible to improve additional control performance.

The power conversion device of embodiment 3 is configured such that, in addition to the current command value and the current harmonic command value, an additional control performance command value is further inputted to the switching pattern determination unit from outside.

Thus, the power conversion device of the present embodiment 3 can control the rotary electric machine so that the current value follows the current command value and the current harmonic becomes equal to or smaller than the current harmonic command value which is a limit value. Further, it is possible to improve additional control performance.

Embodiment 4

A power conversion device of embodiment 4 is configured such that the switching patterns to be determined by the switching pattern determination unit are generated using machine learning.

Hereinafter, operation of the power conversion device according to embodiment 4 will be described, focusing on a difference from embodiment 1, with reference to FIG. 8 which is a block diagram showing the configuration of the power conversion device, FIG. 9 which is a flowchart illustrating a processing procedure in the power conversion device, FIG. 10 which is a block diagram showing the configuration of a machine learning device, and FIG. 11 which is a hardware configuration diagram for implementing the machine learning device.

Figure 8:
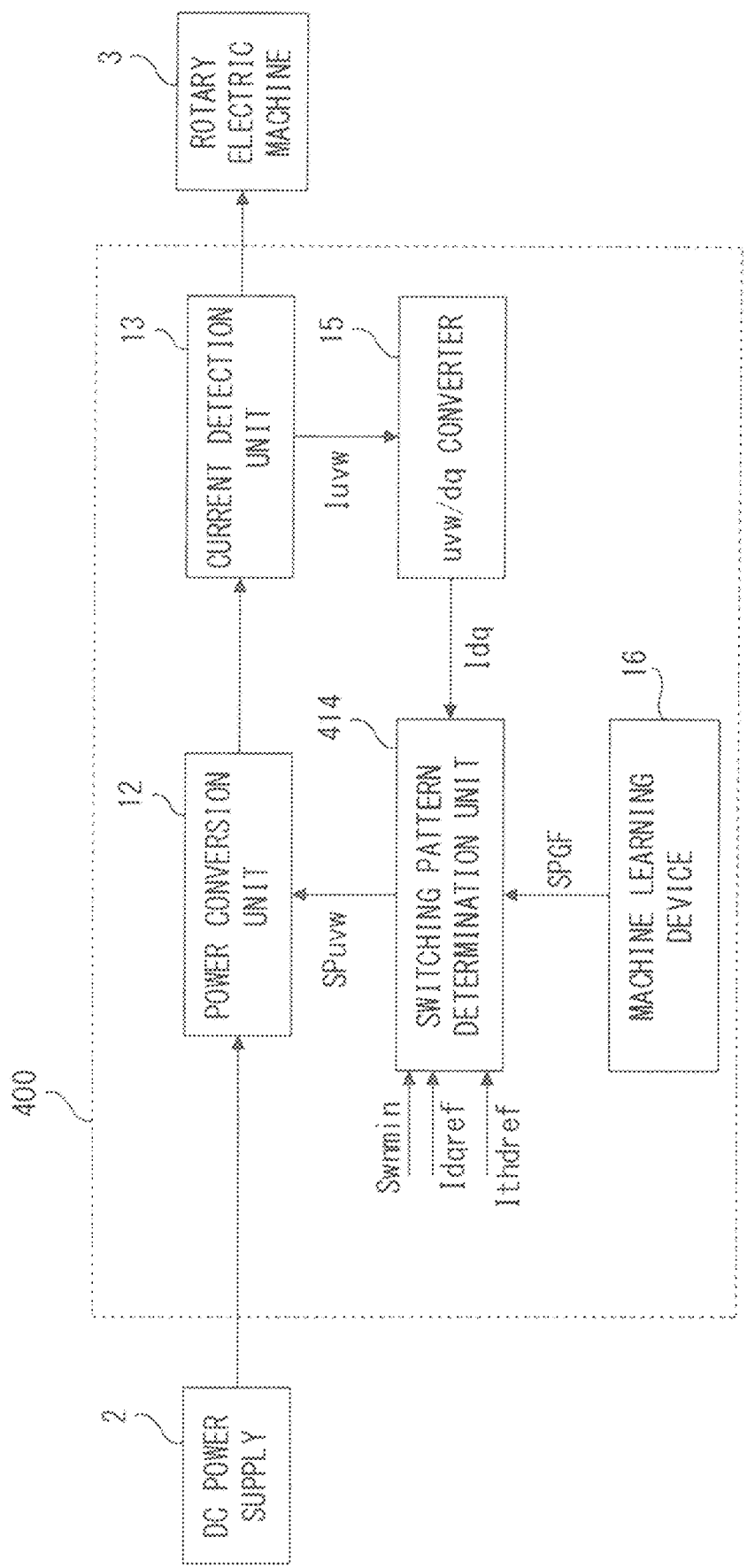
FIG. 8 is a block diagram showing the configuration of a power conversion device according to embodiment 4.

In FIG. 8 which is the block diagram of the power conversion device of embodiment 4, the same or corresponding parts as those in embodiment 1 are denoted by the same reference characters.

First, the configuration of a power conversion device 400 of embodiment 4 will be described with reference to FIG. 8.

The entire system for controlling the rotary electric machine is composed of the power conversion device 400, the DC power supply 2, and the rotary electric machine 3.

In FIG. 8, the power conversion device 400 includes the power conversion unit 12 which is a main circuit, the current detection unit 13, a switching pattern determination unit 414, the uvw/dq converter 15, and a machine learning device 16.

As compared to the power conversion device 1 of embodiment 1, in the power conversion device 400 of embodiment 4, the machine learning device 16 is added.

In FIG. 8, SPGF denotes a switching pattern generation function.

Next, an operation example of the power conversion device 400 of embodiment 4 will be described with reference to FIG. 9 which is a flowchart illustrating an example of the processing procedure.

The processing procedure described below is an example of a learning method and an electric motor control method in embodiment 4. Therefore, each processing in the processing procedure described below may be changed in a possible range. In addition, in the processing procedure described below, processing may be omitted, replaced, or added as appropriate in accordance with embodiments.

Figure 9:
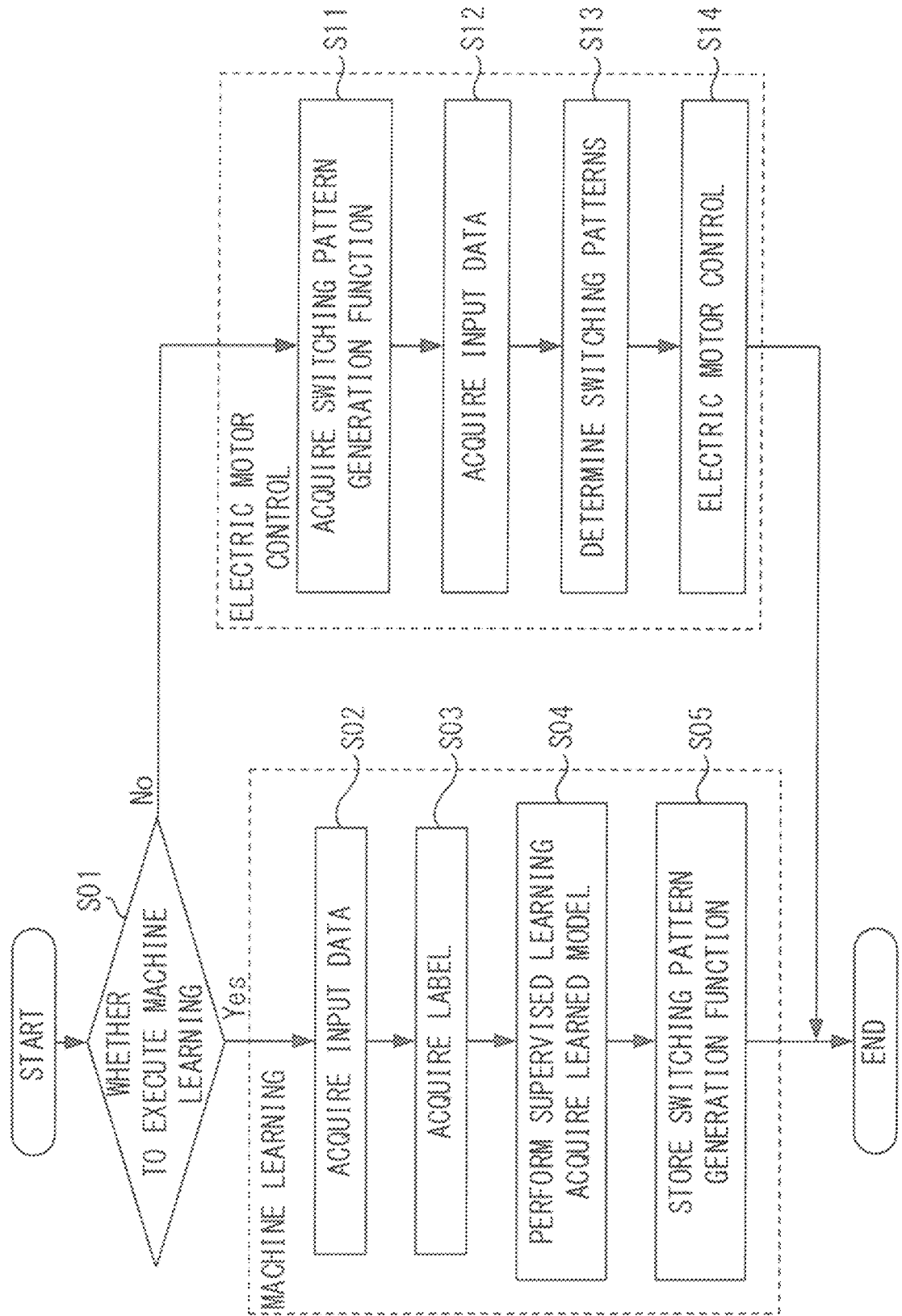
FIG. 9 is a flowchart illustrating a processing procedure in the power conversion device according to embodiment 4.

The flowchart in FIG. 9 is divided mainly into a machine learning process (S02 to S05) and an electric motor control process (S11 to S14), after determining "whether to execute machine learning" (S01).

In step 1 (S01), whether to execute the machine learning is determined. For executing the machine learning (Yes), the machine learning process is performed to generate a learned model. For not executing the machine learning (No), the electric motor control is executed using the learned model that has undergone learning through the machine learning process.

Before describing the machine learning process, here, the configuration of the machine learning device 16 for performing the machine learning will be described with reference to FIG. 10.

The machine learning device 16 includes a teacher data storage unit 161, an input data acquisition unit 162, a label acquisition unit 163, a learning unit 164, and a switching pattern generation function storage unit 165.

Figure 10:
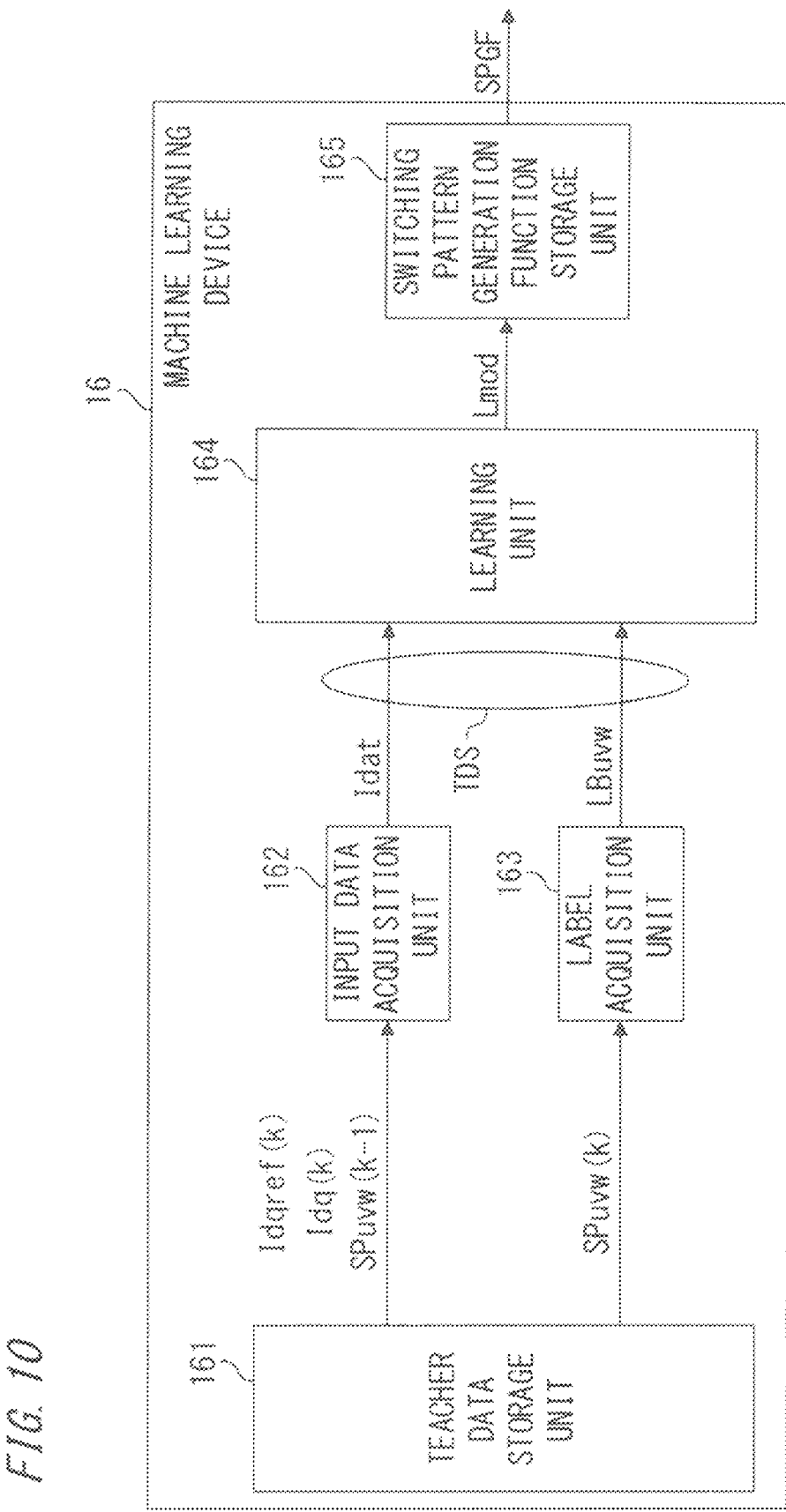
FIG. 10 is a block diagram showing the configuration of a machine learning device according to embodiment 4.

In FIG. 10, Idat denotes input data, LBuvw denotes a label, TDS denotes a teacher data set, and Lmod denotes a learned model.

Hereinafter, the switching pattern generation function storage unit is referred to as an SP generation function storage unit, as appropriate.

In the machine learning, supervised learning based on teacher data prepared in advance is performed. The supervised learning will be described later. The teacher data prepared in advance is stored in the teacher data storage unit 161.

It is noted that the electric motor control performed using the learned model that has undergone learning is such control that the current harmonic of the current values Idq becomes equal to or smaller than the current harmonic command Ithdref. The electric motor control is performed by applying model predictive control or optimized pulse patterns, for example.

Next, the machine learning process will be described with reference to also FIG. 10 which is the configuration diagram of the machine learning device 16.

In step 2 (S02), the input data acquisition unit 162 of the machine learning device 16 acquires current command values Idqref(k), dq coordinate system currents Idq(k), and previous switching patterns SPuvw(k−1) from the teacher data stored in the teacher data storage unit 161, and outputs them as input data Idat to the learning unit 164.

In step 3 (S03), the label acquisition unit 163 of the machine learning device 16 acquires switching patterns SPuvw(k) from the teacher data stored in the teacher data storage unit 161, and outputs them as a label LBuvw to the learning unit 163.

In step 4 (S04), the learning unit 164 of the machine learning device 16 acquires a data set of the input data Idat inputted from the input data acquisition unit 162 and the label LBuvw inputted from the label acquisition unit 163, as a teacher data set, and executes supervised learning. The learning unit 164 performs supervised learning on the basis of the teacher data set, thereby creating a learned model Lmod.

In step 5 (S05), the SP generation function storage unit 165 of the machine learning device 16 stores the learned model obtained through the supervised learning by the learning unit 164, as a switching pattern generation function.

The learned model created by the learning unit 164 is outputted to the SP generation function storage unit 165.

The switching pattern generation function may be updated by regularly executing the process from step 2 (S02) to step 5 (S05).

The learning targeting the electric motor control in the present embodiment 4 is supervised learning using a neural network formed in combination with a perceptron. Specifically, a teacher data set which is a set of input data indicating electric motor states and labels corresponding to the electric motor states is given to the neural network, and learning is repeated while changing weighting for each perceptron so that the outputs of the neural network become equal to the labels. In the learning process, processing called backpropagation is repeatedly performed to adjust the weights so as to reduce error of output of each perceptron.

In this way, the feature of the teacher data set is learned, and a learned model for estimating a result from an input is recursively obtained.

The supervised learning in the present embodiment 4 produces, as a learning result, a learned model for determining the switching patterns SPuvw(k) for the power conversion unit 12 so that the current harmonic of the current values Idq becomes equal to or smaller than the current harmonic command Ithdref.

Here, the supervised learning is such learning as to reduce error between the labels and the output data while adjusting the weights as described above.

The neural network used for learning by the learning unit 164 may be formed with three layers, or the number of layers may be further increased more than this. The learning may be performed by so-called deep learning. The learned model created by the learning unit 164 is outputted to the SP generation function storage unit 165.

The switching pattern generation function stored in the SP generation function storage unit 165 is outputted to the switching pattern determination unit 414, in the electric motor control, and the switching patterns SPuvw(k) for the power conversion unit 12 are determined on the basis of the switching pattern generation function and input data.

Next, an example of the hardware configuration of the machine learning device 16 in the present embodiment will be described with reference to FIG. 11.

The machine learning device 16 for performing the machine learning process described above is implemented by the hardware configuration shown in FIG. 11. The machine learning device 16 includes a processor 30 and a storage device 31 for the processor 30.

In FIG. 11, LRdat denotes learning result data, Tdat denotes teacher data, and Lprg denotes a learning program.

The storage device 31 includes a volatile storage device 311 such as a random access memory (RAM) and a nonvolatile auxiliary storage device 312 such as a hard disk drive (HDD) and solid state drive (SSD).

As the nonvolatile auxiliary storage device 312, a flash memory or the like may be used instead of the HDD. In FIG. 11, the volatile storage device 311 is shown as RAM, and the auxiliary storage device 312 is shown as HDD.

The processor 30 executes various learning programs inputted from the storage device 31.

Because the storage device 31 includes the volatile storage device 311 and the auxiliary storage device 312, the various learning programs are inputted from the auxiliary storage device 312 to the processor 30 via the volatile storage device 311.

The processor 30 may output data such as a learning result of the learning program to the volatile storage device 311 of the storage device 31, or may store such data into the auxiliary storage device 312 via the volatile storage device 311.

The learning program is a program including instructions for causing the processor 30 of the machine learning device 16 to execute the supervised learning process and generate learning result data as a result of the machine learning.

The teacher data therefor is data for performing machine learning by the machine learning device 16 so as to obtain the switching patterns SPuvw(k) for the power conversion unit 12 so that the current harmonic of the current values Idq becomes equal to or smaller than the current harmonic command Ithdref.

The machine learning device 16 can be implemented by a personal computer (PC), a server device, or the like.

It is noted that, for the machine learning device 16, because the calculation amount of the machine learning is large, for example, graphics processing units (GPU) may be mounted to the PC, and using technology called general-purpose computing on graphics processing units (GPGPU), the GPU may be used for calculation processing of the machine learning, so as to enable high-speed processing.

Regarding a specific hardware configuration of the machine learning device 16, components may be omitted, replaced, or added as appropriate in accordance with embodiments.

For example, the machine learning device 16 may include a plurality of processors. In addition, the processor 30 may be composed of a central processing unit (CPU), a field-programmable gate array (FPGA), etc.

Next, the electric motor control to be performed using the learned model that has undergone learning, after the machine learning is performed, will be described with reference to FIG. 9.

The electric motor control process performed when a result of determination as to "whether to execute machine learning" is No in step 1 (S01), will be described.

In step 11 (S11), the switching pattern determination unit 414 acquires the switching pattern generation function which is the learned model obtained through supervised learning by the learning unit 164, from the SP generation function storage unit 165 of the machine learning device 16.

In step 12 (S12), the switching pattern determination unit 414 acquires the current command values Idqref(k), the dq coordinate system currents Idq(k), and the previous switching patterns SPuvw(k−1) for the power conversion unit 12, as input data.

In step 13 (S13), the switching pattern determination unit 414 generates switching patterns SPuvw(k) on the basis of the input data and the switching pattern generation function. Then, the generated switching patterns SPuvw(k) are outputted to the power conversion unit 12.

In step 14 (S14), the power conversion unit 12 supplies AC power to the rotary electric machine 3 on the basis of the switching patterns SPuvw(k) outputted from the switching pattern determination unit 414. The rotary electric machine 3 is driven so that the current values Idq(k) in the dq coordinate system follow the current command values Idqref(k) and the current harmonic of the current values Idq(k) becomes equal to or smaller than the current harmonic command value Ithdref.

The power conversion device of embodiment 4 is configured such that a data set prepared in advance for outputting switching patterns so that the current harmonic of the current value becomes equal to or smaller than the current harmonic command is learned using the machine learning device, and switching patterns are outputted using a switching pattern generation function which is a result of the learning.

It is difficult to implement, in the power conversion device, a method of performing full search using model prediction to calculate switching patterns so that the current harmonic becomes closest to the command value. However, the power conversion device of the present embodiment 4 makes it possible to implement such a control method having a high calculation load, by using machine learning. Then, the rotary electric machine can be controlled so that the current value follows the current command value and the current harmonic becomes equal to or smaller than the current harmonic command value which is a limit value.

It is noted that, for the generation of the learned model by supervised learning, the teacher data prepared in advance may be used as described above, or the supervised learning may be performed by measuring teacher data while the electric motor control is performed.

The supervised learning may be performed by preparing teacher data having, in addition to the feature that the current harmonic of the current value becomes equal to or smaller than the current harmonic command value, such a feature as to more reduce at least one of switching loss of the power conversion unit, drive sound of the rotary electric machine, mechanical vibration of the rotary electric machine, or the time period for the current value to follow the current command value, than in the case of performing control by pulse width modulation (PWM).

The power conversion device of embodiment 4 is configured such that switching patterns to be determined by the switching pattern determination unit are generated using machine learning.

Thus, the power conversion device of the present embodiment 4 can control the rotary electric machine so that the current value follows the current command value and the current harmonic becomes equal to or smaller than the current harmonic command value which is a limit value. Further, it becomes possible to implement a control method having a high calculation load.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

The present disclosure enables control of a rotary electric machine so that a current value follows a command value and a current harmonic becomes equal to or smaller than a limit value, and therefore is widely applicable to power conversion devices.

DESCRIPTION OF THE REFERENCE CHARACTERS 1, 200, 300, 400 power conversion device
2 DC power supply
3 rotary electric machine
12 power conversion unit
13 current detection unit
14, 214, 314, 414 switching pattern determination unit
15 uvw/dq converter
16 machine learning device
20, 30 processor
21, 31 storage device
161 teacher data storage unit
162 input data acquisition unit
163 label acquisition unit
164 learning unit
165 switching pattern generation function storage unit
311 volatile storage device
312 auxiliary storage device

The invention claimed is:

1. A power conversion device which converts DC power to AC power through switching operations of a plurality of switching elements and supplies the AC power to a rotary electric machine, the power conversion device comprising:
a current detection circuitry to detect current flowing through the rotary electric machine;
a switching pattern determination circuitry to determine a switching pattern representing timings of ON/OFF switchover of the plurality of switching elements, on the basis of a current value detected by the current detection circuitry, a current prediction value predicted from the current value, a current command value which is a command value for the current value, and a current harmonic command value which is a command value for a current harmonic of the current value; and
a power conversion circuitry which causes the plurality of switching elements to perform switching operations in accordance with the switching pattern and outputs the AC power to the rotary electric machine, wherein
the switching pattern determination circuitry determines the switching pattern so that the current value follows the current command value and an effective value of a harmonic component of the current value becomes equal to or smaller than the current harmonic command value.

2. The power conversion device according to claim 1, wherein
the switching pattern determination circuitry determines the switching pattern so that the current prediction value follows the current command value and an effective value of a harmonic component of the current prediction value becomes equal to or smaller than the current harmonic command value.

3. The power conversion device according to claim 1, wherein
the current harmonic command value is a command value for a current harmonic effective value calculated using a root sum square of errors of the current prediction value relative to the current command value.

4. The power conversion device according to claim 1, wherein
the current harmonic command value is a command value for a current harmonic effective value calculated by calculating frequency components of the current prediction value and using a root sum square of the frequency components other than a fundamental component.

5. The power conversion device according to claim 1, wherein
the current harmonic command value is a command value for a current harmonic effective value calculated per one cycle of an electric angle which is an angle of a rotating magnetic field of the rotary electric machine.

6. The power conversion device according to claim 1, wherein
the current command value is represented by a locus from a control start time to a calculation cycle of a current harmonic effective value, the locus being generated from the current command value and a slope thereof.

7. The power conversion device according to claim 1, wherein the switching pattern determination circuitry determines an ON/OFF state of each switching element per control cycle.

8. The power conversion device according to claim 1, wherein the switching pattern determination circuitry determines a plurality of ON/OFF states of each switching element and determines an output order of the plurality of ON/OFF states and a switchover timing thereof.

9. The power conversion device according to claim 1, wherein the switching pattern determination circuitry selects a switching pattern in which a number of times of switching of each switching element is smallest from among such switching patterns that the current value becomes equal to or smaller than the current harmonic command value.

10. The power conversion device according to claim 2, wherein the current harmonic command value is a command value for a current harmonic effective value calculated using a root sum square of errors of the current prediction value relative to the current command value.

11. The power conversion device according to claim 2, wherein the current harmonic command value is a command value for a current harmonic effective value calculated by calculating frequency components of the current prediction value and using a root sum square of the frequency components other than a fundamental component.

12. The power conversion device according to claim 2, wherein the current harmonic command value is a command value for a current harmonic effective value calculated per one cycle of an electric angle which is an angle of a rotating magnetic field of the rotary electric machine.

13. The power conversion device according to claim 2, wherein the current command value is represented by a locus from a control start time to a calculation cycle of a current harmonic effective value, the locus being generated from the current command value and a slope thereof.

14. The power conversion device according to claim 1, wherein the switching pattern determination circuitry determines an ON/OFF state of each switching element per control cycle.

15. The power conversion device according to claim 2, wherein the switching pattern determination circuitry determines a plurality of ON/OFF states of each switching element and determines an output order of the plurality of ON/OFF states and a switchover timing thereof.

16. The power conversion device according to claim 2, wherein the switching pattern determination circuitry selects a switching pattern in which a number of times of switching of each switching element is smallest from among such switching patterns that the current value becomes equal to or smaller than the current harmonic command value.

17. A power conversion device which converts DC power to AC power through switching operations of a plurality of switching elements and supplies the AC power to a rotary electric machine, the power conversion device comprising:

a current detection circuitry to detect current flowing through the rotary electric machine;

a switching pattern determination circuitry to determine a switching pattern representing timings of ON/OFF switchover of the plurality of switching elements, on the basis of a current value detected by the current detection circuitry, a current command value which is a command value for the current value, and a current harmonic command value which is a command value for a current harmonic of the current value; and a power conversion circuitry which causes the plurality of switching elements to perform switching operations in accordance with the switching pattern and outputs the AC power to the rotary electric machine, wherein the switching pattern determination circuitry determines the switching pattern so that the current value follows the current command value and an effective value of a harmonic component of the current value becomes equal to or smaller than the current harmonic command value, and wherein the switching pattern determination circuitry determines the switching pattern on the basis of the current value, the current command value, and a switching pattern generation function outputted from a machine learning device which has undergone machine learning for outputting the switching pattern generation function for determining the switching pattern, on the basis of the current value, the current command value, and the current harmonic command value.

18. The power conversion device according to claim 17, wherein the switching pattern determination circuitry acquires, from the machine learning device, the switching pattern generation function that more reduces at least one of switching loss of the power conversion circuitry, drive sound of the rotary electric machine, mechanical vibration of the rotary electric machine, or a time period for the current value to follow the current command value, than in a case of performing control by pulse width modulation.

19. The power conversion device according to claim 17, further comprising the machine learning device.

20. The power conversion device according to claim 18, further comprising the machine learning device.

* * * * *